3,117,099
CURABLE MIXTURES COMPRISING EPOXIDE COMPOSITIONS AND DIVALENT TIN SALTS
William R. Proops, Charleston, and George W. Fowler, South Charleston, W. Va., assignors to Union Carbide Corporation, a corporation of New York
No Drawing. Filed Dec. 24, 1959, Ser. No. 861,748
10 Claims. (Cl. 260—18)

This invention relates to epoxide compositions and to the curing of certain epoxides with divalent tin catalysts.

A variety of catalysts have been suggested for use in promoting the cure or polymerization of epoxide compositions into hardened, infusible and insoluble products of relatively high molecular weight, the cured epoxy compound being either in the form of a homopolymer or copolymer with various organic compounds capable of interaction with the active groups of the epoxide. Included among the known catalysts are strongly acidic materials such as sulfuric acid, phosphoric acid, etc.; aromatic sulfonic acids such as toluenesulfonic acid and benzenesulfonic acid; Lewis acids, e.g., boron trifluoride, stannic chloride, etc.; and boron trifluoride-amine complexes such as boron trifluoride-monoethylamine, boron trifluoride-piperidine, and the like. Although these catalysts are effective for the curing or polymerization process, their use has been handicapped to some extent due to a number of reasons. For example, the use of Lewis acid catalysts such as boron trifluoride suffer the disadvantage of effecting rapid and uncontrolled exotherms during the cure of epoxides to resins, frequently causing thermal decomposition in the composition as evidenced by charring, or expulsion of components as indicated by bubble formation and foaming. A number of these catalysts are of a corrosive nature and cause uncontrollable gel rates in the cure of certain epoxide formulations which thus seriously limits their industrial application in the field of coatings, adhesives, and potting compositions.

The present invention is based on the discovery that divalent tin compounds selected from the group consisting of stannous acylates and stannous alkoxides are especially effective catalysts for promoting the cure of epoxide compositions which contain either a cyclohexene oxide or cyclopentene oxide group. It has been found that the incorporation of stannous acylates or stannous alkoxides in epoxide compounds of the above type provides curable compositions which have a good working life and can be cured at room temperature without incurring rapid gelation or uncontrollable exotherms. The curable compositions can be spread, brushed or sprayed by techniques known in the paint, varnish and lacquer industries, and can be advantageously used in the encapsulation of electrical components. Mixtures of stannous catalysts with epoxides containing the cyclohexene oxide or cyclopentene oxide group offer a distinct advantage over epoxides of the polyglycidyl ether type inasmuch as they can be reacted with various hardeners and foamed by internal development of carbon dioxide or by a blowing agent which vaporizes at or below the temperature of the foaming mass to provide foamed polymers of widely varying and preselected properties. Foamed polymers of this type find wide utility in the field of structural reinforcement and insulation.

The stannous acylates which are used for purposes of the invention are the divalent tin salts of aliphatic mono- and dicarboxylic acids which contain from 1 to 54 carbon atoms. The acids can be saturated such as acetic acid, 2-ethylhexanoic, etc., or they may be unsaturated acids such as oleic, linoleic, ricinoleic, and the like.

Examples of specific stannous acylates which can be used include: stannous acetate, stannous propionate, stannous oxalate, stannous tartrate, stannous butyrate, stannous valerate, stannous caproate, stannous caprylate, stannous octoate, stannous laurate, stannous palmitate, stannous stearate, and stannous oleate. Of these materials the preferred catalysts are stannous acetate, stannous octoate and stannous oleate.

The stannous compounds which are used may be represented by the formula:

$$Sn(OR)_2$$

in which R is a monovalent hydrocarbon radical, saturated or unsaturated, branched chain or straight chain, containing 1 to 18 carbon atoms, preferably 3 to 12. Representative examples of stannous alkoxides include stannous methoxide, stannous isopropoxide, stannous butoxide, stannous t-butoxide, stannous 2-ethylhexoxide, stannous tridecanoxide, stannous heptadecanoxide, stannous phenoxide, and o, m and p-stannous cresoxides, etc.

Either class of stannous catalysts may be substituted with hydroxy, halo and keto, etc., groups.

In carrying out the invention the stannous catalysts are mixed with epoxides to obtain a homogeneous curable composition. With epoxides that are liquid and viscous, the catalyst can be simply admixed with the epoxide by conventional means as, for example, by stirrers and impellers, etc. When the catalyst and epoxide are immiscible at room temperatures, or if the epoxide is normally solid, the epoxide can be melted or mixed with a liquid organic solvent. Typical solvents include organic ethers such as diethyl ether, methyl propyl ether, etc.; organic esters, such as methyl acetate, ethyl propionate, etc.; and organic ketones such as acetone and cyclohexanone, etc.

The amount of catalyst employed will vary with the cure rate desired and the curing temperature employed. As a general guide good results are obtained by utilizing the stannous catalyst in amounts ranging between 0.001 and 20 percent, preferably 0.1 to 10 percent, by weight, based on the total weight of the curable epoxide composition.

The mixture of epoxide composition and catalyst can be cured over a wide temperature range. For example, the catalyst can be added to the epoxide composition at room temperatures, i.e., about 15 to 25° C., and the cure effected, or if a rapid cure is desired the mixture can be heated to temperatures as high as 250° C. or more. Higher temperatures above 250° C. are generally undesirable due to the discoloration which may be induced. Other single curing temperatures and combinations of curing temperatures can be employed as desired.

The stannous catalysts above described are used to promote the cure of a wide variety of known epoxide compositions which contain either a cyclohexene oxide or cyclopentene oxide group, the cured composition produced being in the form of a homopolymer or copolymer with an active organic hardener. The curable epoxide compositions can be monomeric or polymeric, saturated or unsaturated, aliphatic, aromatic or heterocyclic, and can be substituted, if desired, with substituents such as hydroxy, halide, alkyl, aryl, carboxyl, etc.

Specific examples of epoxides which can be cured to provide a variety of useful products are those which contain one or more cyclohexene oxide groups, the term "cyclohexene oxide" referring to the structure:

Among such epoxides are included: aliphatic polyol epoxycyclohexanecarboxylates exemplified by compounds which include 3-methyl-1,5-pentanediol bis(3,4-epoxycyclohexanecarboxylate), 1,5-pentanediol bis(3,4-epoxycyclohexanecarboxylate),
2-methoxymethyl-2,4-dimethyl-1,5-pentanediol bis(3,4-epoxycyclohexanecarboxylate),
ethylene glycol bis(3,4-epoxycyclohexanecarboxylate),
2,2-diethyl-1,3-propanediol bis(3,4-epoxyyclohexanecarboxylate),
1,6-hexanediol bis(3,4-epoxycyclohexanecarboxylate),
2-butene-1,4-diol bis(3,4-epoxycyclohexanecarboxylate),
2-butene-1,4-diol bis(3,4-epoxy-6-methylcyclohexanecarboxylate),
1,1,1-trimethylolpropane tris(3,4-epoxycyclohexanecarboxylate),
1,2,3-propanetriol tris(3,4-epoxycyclohexanecarboxylate);

oxyalkylene glycol epoxycyclohexanecarboxylates exemplified by compounds which include dipropylene glycol bis(2-ethylhexyl 4,5-epoxycyclohexane-1,2-dicarboxylate),
diethylene glycol bis(3,4-epoxy-6-methylcyclohexanecarboxylate),
triethylene glycol bis(3,4-epoxycyclohexanecarboxylate;

epoxycyclohexylalkyl epoxycyclohexanecarboxylates exemplified by compounds which include 3,4-epoxycyclohexylmethyl 3,4-epoxycyclohexanecarboxylate,
3,4-epoxy-1-methylcyclohexylmethyl 3,4-epoxy-1-methylcyclohexanecarboxylate,
3,4-epoxy-2-methylcyclohexylmethyl 3,4-epoxy-2-methylcyclohexanecarboxylate,
(1-chloro-3,4-epoxycyclohexan-1-yl)methyl 1,-chloro-3,4-epoxycyclohexanecarboxylate,
(1-bromo-3,4-epoxycyclohexan-1-yl)-methyl 1-bromo-3,4-epoxycyclohexanecarboxylate,
(1-chloro-2-methyl-4,5-epoxycyclohexan-1-yl)methyl 1-chloro-2-methyl-4,5-epoxycyclohexanecarboxylate;

epoxycyclohexylalkyl dicarboxylates exemplified by compounds which include bis(3,4-epoxycyclohexylmethyl) pimelate,
bis(3,4-epoxy-6-methylcyclohexylmethyl) maleate,
bis(3,4-epoxy-6-methylcyclohexylmethyl) succinate,
bis(3,4-epoxycyclohexylmethyl) oxalate,
bis(3,4-epoxy-6-methylcyclohexylmethyl) sebacate,
bis(3,4-epoxy-6-methylcyclohexylmethyl) adipate;

epoxycyclohexylalkyl phenylenedicarboxylates exemplified compounds which include bis(3,4-epoxycyclohexylmethyl) terephthalate,
bis(3,4-epoxy-6-methylcyclohexylmethyl) terephthalate;

epoxycyclohexylalkyl oxyalkylene glycol ethers exemplified by compounds which include bis(3,4-epoxy-6-methylcyclohexylmethyl) diethylene glycol ether;

sulfonyldialkanol bis(epoxycyclohexanecarboxylates) exemplified by compounds which include 2,2'-sulfonyldiethanol bis(3,4-epoxycyclohexanecarboxylate);

epoxycyclohexane-1,2-dicarboximides exemplified by compounds which include

N,N'-ethylene bis(4,5-epoxycyclohexane-1,2-dicarboximide);

epoxycyclohexylalkyl carbamates exemplified by compounds which include di(3,4-epoxycyclohexylmethyl) 1,3-tolylenedicarbamate;

epoxycyclohexylalkyl acetals exemplified by compounds which include bis(3,4-epoxy-6-methylcyclohexylmethyl) 3,4-epoxy-6-methylcyclohexanecarboxaldehyde acetal;

and epoxycyclohexyl-substituted spirobi(metadioxane) derivatives exemplified by compounds which include 3,9-bis(3,4-epoxycyclohexyl) spirobi(meta-dioxane).

Other epoxide derivatives may be employed, such as vinyl cyclohexene dioxide, vinyl cyclohexene monoxide, 3,4-epoxycyclohexylmethyl acrylate, 3,4-epoxy-6-methylcyclohexylmethyl 9,10-epoxystearate, 1,2-bis(2,3-epoxy-2-methylpropoxy)ethane, and the like.

Other epoxides which can be cured are those which contain one or more cyclopentene oxide groups, the term "cyclopentene oxide" referring to the structure:

Among such epoxides are included bis(2,3-epoxycyclopentyl) ether; dicyclopentadiene dioxide; glycidyl 2,3-epoxycyclopentyl ether; 2,3-epoxycyclopentyl 2-methylglycidyl ether; 2,3-epoxycyclopentyl acrylate; 2,3-epoxycyclopentyl cyclopentyl ether; 2,3-epoxycyclopentyl phenyl ether; 2,3-epoxycyclopentyl 2-cyclopentenyl ether; 2,3-epoxycyclopentyl crotonate; allyl 2,3-epoxycyclopentyl ether; 2,3-epoxycyclopentanol; dicyclopentadiene monoxide; and the like.

The epoxides with the stannous catalyst of the type illustrated above can be homopolymerized or copolymerized with an active organic hardener or combination of active organic hardeners. By the term "active organic hardener," as used herein, is meant an organic compound which contains two or more groups which are reactive with epoxy groups. The active organic hardeners illustrated hereinafter are employed in a curing amount, that is, an amount which is sufficient to cause the epoxide system containing the active organic hardener(s) to become polymerized. The active organic hardeners can also be employed in varying amounts so as to give a wide variety of properties to the cured epoxide system. Typical groups which are reactive with epoxy groups are active hydrogen groups such as hydroxyl groups, carboxyl groups, amino groups, thiol groups, and the like; and isocyanate groups, isothiocyanate groups, halide atoms of acyl halides, and the like. Oxydicarbonyl groups such as those contained by polycarboxylic acid anhydrides are also active with epoxy groups. One oxydicarbonyl group will react with two epoxy groups and, in this connection, polycarboxylic acid anhydrides need only contain one oxydicarbonyl group in order to function as an active organic hardener with the epoxide compositions of this invention. Stated differently, one oxydicarbonyl group of an anhydride is equivalent to two epoxy-reactive groups.

Representative active organic hardeners include polyfunctional amines, polycarboxylic acid, polycarboxylic acid anhydrides, polyols, i.e., polyhydric phenols and polyhydric alcohols, polythiols, polyisocyanates, polythioisocyanates, polyacyl halides and others. By the term "polyfunctional amine," as used herein, is meant an amine having at least two active amino hydrogen atoms which can be on the same nitrogen atom or different nitrogen atoms.

Resins having particularly valuable properties can be formed from mixtures containing the epoxide compositions and polyfunctional amines in such relative proportions as provide from 0.2 to 5.0 amino hydrogens of the amine for each epoxy contained by said epoxide composition. It is preferred to form resins from curable mixtures containg the epoxide compositions and polyfunctional amines which provide from 0.3 to 3.0 amino hydrogens for each epoxy group.

Among the polyfunctional amines contemplated as active organic hardeners include the aliphatic amines, aromatic amines, aralkyl amines, cycloaliphatic amines, alkaryl amines, aliphatic polyamines including polyalkylene polyamines, amino-substituted aliphatic alcohols and phenols, polyamides, addition products of polyamines and low molecular weight epoxides containing oxirane oxygen linked to vicinal carbon atoms, and others.

Typical aliphatic amines include methylamine, ethylamine, propylamine, isopropylamine, butylamine, isobutylamine, 2-ethylhexylamine, 3-propylheptylamine, and the like.

Examples of aromatic amines, aralkyl amines and alkaryl amines include, among others, aniline, o-hydroxyaniline, m-toluidine, 2,3-xylidine, benzylamine, phenethylamine, 1-naphthylamine, meta-, ortho-, and paraphenylenediamines, 1,4-naphthalenediamine, 3,4-toluenediamine and the like.

Illustrative cycloaliphatic amines include cyclopentylamine, cyclohexylamine, p-menthane-1,8-diamine and others.

Among the polyamides, i.e., those having an average molecular weight range from about 300 to about 10,000, include condensation products of polycarboxylic acids, in particular, hydrocarbon dicarboxylic acids, such as malonic acid, succinic acid, glutaric acid, adipic acid, dilinolenic acid, and the like, with polyamines, particularly diamines, such as ethylenediamine, propylenediamine and the like.

Aliphatic polyamines include ethylenediamine, propylenediamine, butylenediamine, pentylenediamine, hexylenediamine, octylenediamine, nonlenediamine, decylenediamine, and the like. Polyalkylene polyamines such as diethylenetriamine, triethylenetetramine, retraethylpentamine, dipropylenetriamine, and the like, are particularly suitable.

The amino-substituted aliphatic alcohols and phenols suitable for use in the present invention are illustrated by 2-aminoethanol, 2-aminopropanol, 3-aminobutanol, 1,3-diamino-2-propanol, 2-aminophenyl, 4-aminophenyl, 2,3-diaminoxylenol, and the like.

Other illustrations of polyfunctional amines are the addition products of polyamines, in particular, diamines and triamines and epoxides containing oxirane oxygen linked to vicinal carbon atoms, such as ethylene oxide, propylene oxide, butadiene dioxide, diglycidyl ether, epoxidized soybean oil, epoxidized safflower oil, and polyglycidyl polyethers, such as those prepared from polyhydric phenols and epichlorohydrin. Particularly useful polyfunctional amines are the mono- and polyhydroxylalkyl polyalkylene and arylene polyamines which can be prepared by the addition reaction of polyalkylene polyamines, arylene polyamines, and the like, e.g., ethylenediamine, propylenediamine, diethylenetriamine, hexamethylenediamine, triethylenetetramine, tetraethylenepentamine, phenylenediamine, methylenedianiline, xylenediamine, and the like, with ethylene oxide or propylene oxide such that the resulting amine adduct contains two or more active hydrogen atoms attached to either one or more amino nitrogen atoms.

Examples of still other polyfunctional amines suitably adaptable include, among others, heterocyclic nitrogen compounds such as piperazine, 2,5-dimethylpiperazine, and the like; aminoalkyl-substituted heterocyclic compounds such as N-(aminopropyl)-morpholine, N-(aminoethyl)morpholine, and the like; amino-substituted heterocyclic nitrogen compounds such as melamine, 2,4-diamino-6-(aminoethyl)pyrimidine, and the like; dimethylurea, guanidine, p,p' - sulfonyldianiline, 3,9 - bis(aminoethyl)-spirobimetadioxane, hexahydrobenzamide, and others.

Other polyfunctional amines having a total of at least two active amino hydrogen atoms to the molecule can be employed in the epoxide compositions of this invention. For example, such polyfunctional amines as mixtures of p,p'-methylenedianiline and m-phenylenediamine, or other mixtures of two or more polyfunctional amines can be used.

Another class of active organic hardeners which can be reacted with the epoxide compositions above, are the polycarboxylic acids. By the term "polycarboxylic acid", as used herein, is meant a compound or polymer having two or more carboxyl groups to the molecule. Curable mixtures can be formed from the epoxide compositions and polycarboxylic acids, which mixtures can be cured to produce a wide variety of useful products. Valuable resins can be made from mixtures containing such amounts of an epoxide composition and polycarboxylic acid as to provide 0.3 to 1.25 carboxyl groups of the acid for each epoxy group contained by the amount of the epoxide composition. It is preferred, however, to make resins from curable mixtures which contain such amounts of polycarboxylic acids and epoxide compositions as to provide 0.3 to 1.0 carboxyl group of the acid for each epoxy groups from the epoxide composition.

Representative polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydramuconic acid, beta-hydromuconic acid, diglycollic acid, dilactic acid, thiodiglycollic acid, 4-amyl-2,5-heptadienedioic acid, 3-hexynedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetra-hydrophthalic acid, tetrachlorophthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl, 1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, polymerized fatty acids derived from natural oils, e.g., linseed oil, tung oil, soybean oil, dehydrated castor oil, etc., including mixtures thereof, which have a molecular weight within the range of 500 to 5000, and the like.

Also, as polycarboxylic acids useful in the polymerizable compositions there are included compounds containing ester groups in addition to two or more carboxy groups which can be termed polycarboxy polyesters of polycarboxylic acids, such as those listed above, or the corresponding anhydrides of said acids, esterified with polyhydric alcohols. Stated in other words, by the term "polycarboxy polyesters," as used herein, is meant polyesters containing two or more carboxy groups per molecule. These polycarboxy polyesters can be prepared by known condensation procedures, employing mol ratios favoring greater than equivalent amounts of polycarboxylic acid, or anhydride. More specifically, the amount of polycarboxylic acid, or anhydride, employed in the esterification reaction should contain more carboxy groups than are required to react with the hydroxyl groups of the amount of polyhydric reactant.

Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol, hexane-1,4-diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpropane-1,3-diol, 2,2-diethylhexane-1,3-diol, 2,5-dimethylhexane-2,5-diol, octadecane-1,12-diol, 1-butene-3,4-diol, 2-butene-1,4-diol, 2-butyne-1,4-diol, 2,5-dimethyl-3-hexyne-2,5-diol and the like; trihydric alcohols such as glycerol, trimethylolethane, hexane-1,2,6-triol, 1,1,1-trimethylolpropane, and the ethylene oxide and propylene oxide adducts thereof; tetrahydric compounds, such as pentaerythritol, diglycerol, and the like; and higher polyhydric compounds such as pentaglycerol, dipentaerythritol, polyvinyl alcohols and the like. Additional polyhydric alcohols useful in making polycarboxy polyesters can be prepared by the reaction of epoxides, e.g., diglycidyl diethers of 2,2-propane bisphenol, and reactive hydrogen-containing organic compounds, e.g., amines, polycarboxylic acids, polyhydric compounds and the like. In forming the polycarboxy polyesters it is preferable to use a dihydric, trihydric or tetrahydric aliphatic or oxaaliphatic alcohol. The mol ratios in which the polycarboxyl acid or anhydride can be reacted with polyhydric alcohols in preparing polycarboxylic polyesters useful in the compositions are those which provide polyesters having more than one carboxy group per molecule.

Curable mixtures containing the epoxide compositions and polycarboxylic acid anhydrides can also be employed to produce resins having diversified and valuable properties. Particularly valuable resins can be made from mixtures containing such amounts of polycarboxylic acid anhydride and epoxide compositions as to provide 0.2 to 3.0 carboxy equivalent of the anhydride for each epoxy group of the epoxide composition. It is preferred, however, to make resins from curable mixtures which contain such amounts of polycarboxylic acid anhydride and epoxide composition as to provide 0.4 to 2.0 carboxy equivalent of anhydride for each epoxy group contained by the amount of epoxide concentration.

Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride; hexachloroendomethylenetetrahydrophthalic anhydride, otherwise known as chlorendic anhydride, tetrabromophthalic anhydride, tetraiodophthalic anhydride; phthalic anhydride, 4-nitrophthalic anhydride, 1,2-naphthalic anhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our polymerizable compositions include the Diels-Alder adducts of maleic acid and alicyclic compounds having conjugated double bonds, e.g., methylbicyclo-[2.2.1]heptene-2,3-dicarboxylic anhydride.

Thermoset resins can be prepared from mixtures containing the epoxide compositions and polyols by providing 0.1 to 2.0, preferably from 0.2 to 1.5, hydroxyl groups of the polyol for each epoxy group contained by the amount of the epoxide composition. By the term "polyol," as used herein, is meant an organic compound having at least two hydroxyl groups which are alcoholic hydroxyl groups, phenolic hydroxyl groups, or both alcoholic and phenolic hydroxyl groups. The epoxide composition and polyol can be mixed in any convenient manner. A preferred method, however, is to mix the polyol and epoxide composition in the liquid state so as to obtain a uniform mixture. In forming this mixture it may be necessary to raise the temperature of the polyol and epoxide composition to at least the melting point or melting point range of the highest melting component. Temperatures below about 150° C. are preferred so as to avoid possible premature curing of these curable mixtures. Stirring also aids the formation of a homogeneous mixture.

Representative polyols include ethylene glycol, diethylene glycol, polyethylene glycols, propylene glycol, dipropylene glycol, polypropylene glycols, trimethylene glycols, butanediols, pentanediols, 12,13-tetracosanediol, glycerol, polyglycerols, pentaerythritol, sorbitol, polyvinyl alcohols, cyclohexanediols, inositol, dihydroxytoluenes, resorcinol, catechol, bis(4-hydroxyphenyl)-2,2-propane, bis(4-hydroxyphenyl)-methane, and the ethylene and propylene oxide adducts thereof, etc.

The following examples illustrate the best mode now contemplated for carrying out the invention.

In the following examples the examination or description of the resins were conducted at room temperature, i.e., about 22° C. Barcol hardness values were determined by the use of Barcol Impressor GYZJ–934–1 at room temperature.

EXAMPLES 1–12

In the following examples, 1.53 grams of 3,4-epoxy-6-methylcyclohexylmethyl 3,4-epoxy-6-methylcyclohexanecarboxylate was mixed with stannous octoate catalyst and various active organic hardeners. Except of Example 11, the catalyst was added to each system in an amount ranging between 0.7 to 1.0 percent by weight based on the total mixture. A control without catalyst was made for comparison. The mixtures were held at 120 or 160° C. for the period of time indicated in Table I during which time gelation generally occurred. As shown in Table I, the stannous octoate catalyst effectively promotes the alcoholic-epoxide, phenolic hydroxyl-epoxide, carboxylic acid-epoxide, acid anhydride-epoxide, isocyanate-epoxide, and epoxide homopolymerization reaction. In every instance where stannous octoate was used the gel time was decreased and/or the resulting products more resinous.

*Table I*

| Example | Organic Hardener | Grams | Ratio [a] | Gel Time Hrs. | Gel Time °C. | Cure Hrs. | Cure °C. | Resin Description |
|---|---|---|---|---|---|---|---|---|
| 1 | Hexanetriol | 0.23 | 0.5 | | | 5.5 / 14 | 120 / 160 | Soft yellow solid, slightly tacky. |
| 2 | Control | 0.23 | 0.5 | | | 5.5 / 14 | 120 / 160 | Amber, viscous liquid. |
| 3 | Bisphenol A | 0.64 | 0.5 | 7.5 | 160 | 19.5 | 160 | Amber, brittle. |
| 4 | Control | 0.64 | 0.5 | 13–19.5 | 160 | 19.5 | 160 | Do. |
| 5 | Methyl nadic anhydride.[b] | 0.9 | 1.0 | 0.75 | 120 | 13.5 / 6 | 120 / 160 | Yellow, tough, Barcol 55. |
| 6 | Control | 0.9 | 1.0 | 8.5 | 120 | 13.5 / 6 | 120 / 160 | Yellow, tough, Barcol 54. |
| 7 | Toluene diisocyanate. | 0.9 | 1.0 | 2.5 | 120 | 13.5 / 6 | 120 / 160 | Amber, brittle. |
| 8 | Control | 0.9 | 1.0 | 7.5 | 120 | 13.5 / 6 | 120 / 160 | Do. |
| 9 | Sebacic acid | 1.0 | 0.5 | 0.1 | 120 | 5.5 / 14 | 120 / 160 | Yellow, tough, Barcol 14. |
| 10 | Control | 1.0 | 0.5 | 2.0 | 120 | 5.5 / 14 | 120 / 160 | Yellow, tough, Barcol 12. |
| 11 | Stannous octoate | 0.07 | [c] 4.6 | | | 14 | 160 | Pale amber, brittle. |
| 12 | Control | | | | | 14 | 160 | Slightly viscous liquid. |

[a] Ratio of reactive or functional groups per one epoxide group.
[b] Methylbicyclo-[2.2.1]heptene-2,3-dicarboxylic anhydride.
[c] Weight percent.

EXAMPLES 13–18

In the following examples, various epoxies were admixed in the proportions indicated with a hardener system consisting of a polyol and polycarboxylic acid anhydride. The temperature of these mixtures was maintained at about 22 to 28° C. until a cured or partially cured resin was obtained. The results are shown below in Table II.

*Table II*

| Example | Epoxide | Grams | Organic Hardener | Grams | Catalyst | Grams | Percent | Resin Description |
|---|---|---|---|---|---|---|---|---|
| 13 | Dicyclopentadiene dioxide (Endo). | 22 | Maleic anhydride / Trimethylol propane | 10.4 / 2.4 | None | | | Resinous on top after 4 days. |
| 14 | ....do.... | 22 | Maleic anhydride / Trimethylol propane | 10.4 / 2.4 | Stannous octoate | 0.45 | 1.3 | Resinous in one day. |
| 15 | Dicyclopentadiene dioxide (Exo). | 22 | Maleic anhydride / Trimethylol propane | 10.4 / 2.4 | None | | | Fluid after 4 days. |
| 16 | ....do.... | 22 | Maleic anhydride / Trimethylol propane | 10.4 / 2.4 | Stannous octoate | 0.45 | 1.3 | Thickened after one day. |
| 17 | Diglycidyl ether of Bisphenol A. | 62.5 | Maleic anhydride / Hexanetriol | 12.0 / 4.4 | None | | | Remained liquid after 6 days. |
| 18 | ....do.... | 62.5 | Maleic anhydride / Hexanetriol | 12.0 / 4.4 | Stannous octoate | 0.8 | 1.0 | Tack free on top after 6 days. |

EXAMPLES 19–25

In the following examples 7.55 grams of 3,4-epoxy-6-methylcyclohexylmethyl 3,4-epoxy-6-methylcyclohexanecarboxylate were mixed with 7.45 grams of polymerized fatty acids [1] in the proportions of 0.5 carboxyl group per one epoxide group. Stannous catalysts were then added to the mixture in the amounts indicated below in Table III. Gel times were observed at 160° C. with all resins being cured for the total of from 12 to 13 hours at 160° C. As shown below, the effectiveness of the stannous catalysts provide a short gel time as compared to the non-catalyzed control. The catalyzed systems also demonstrated a harder and more completely cured resin.

*Table III*

| Example No. | Catalyst | Wt., g.[a] | Gel Times at 160° C., mins. | Resin Description |
|---|---|---|---|---|
| 19 | None | | 55–60 | Flexible, Barcol <0. |
| 20 | Stannous acetate | 0.070 | 30 | Rigid. |
| 21 | Stannous oxalate | 0.073 | 30 | Flexible. |
| 22 | Stannous tartrate | 0.099 | 30 | Do. |
| 23 | Stannous octoate | 0.15 | <15 | Rigid, Barcol 10–18. |
| 24 | Stannous oleate | 0.26 | <12 | Rigid, Barcol 10–15. |
| 25 | Stannous 2-ethyl-hexoide. | 0.12 | 8 | Rigid, Barcol 0–10 |

[1] Emery 3162S trimer acid, 900 mol. wt.: acid value = 183–188; Saponification value = 192–198; Specific gravity = 0.959 at 29° C.

[a] The catalyst concentration was about 0.3 percent as tin.

The following data illustrates the comparison between stannous acylate catalysts and boron trifluoride-amine complexes.

5.75 grams of 3,4-epoxy-6-methylcyclohexylmethyl 3,4-epoxy-6-methylcyclohexanecarboxylate were mixed with 9.25 grams of trimer acid used in Examples 19 to 25 in the proportion of one epoxide group per 0.8 carboxyl group. Stannous octoate and boron trifluoride-monoethylamine, in the amounts indicated below, were then added and the resulting mixtures gelled at 120° C. After gelling the mixtures were post cured for 5.5 to 6.8 hours at 120° C. plus 6 hours at 160° C. The resulting cured resins were about ¼ inch in thickness and about 2¼ inches in diameter. These resin plaques were tested with a du Pont Parlin Impact Tester for impact strength and the results reported in inch pounds. As shown in Table IV high impact strength of the resins containing stannous octoate catalysts were obtained in comparison to those compositions containing the boron trifluoride-monoethylamine catalysts. The resins based on the conventional BF₃-monoethylamine complex were pitted on the bottom indicating possible compatibility problems and were pitted in an amount proportional to the catalyst concentration used. No resin flaws were noted when stannous catalysts were employed.

*Table IV*

| Catalyst Conc., percent | Impact, in. lbs. | |
|---|---|---|
| | BF₃–MEA | Sn Octoate |
| 0.5 | 8 | 28 |
| 1.0 | 6 | 36 |
| 1.5 | 5 | 64 |
| 3.0 | 4 | 80 |
| 5.0 | 8 | 26 |

EXAMPLES 26–31

7.55 grams of 3,4-epoxy-6-methylcyclohexylmethyl 3,4-epoxy-6-methylcyclohexanecarboxylate were mixed with 7.45 grams of trimer acid used in Examples 19 to 25 in the proportion of one epoxide group per 0.5 carboxyl group. The various catalysts, as shown in the table below, were then added to the mixture in such an amount as to provide about 0.3 of one percent as tin based on the weight of epoxide and acid. As shown below in Table V, the effectiveness of the catalysts is reflected in the corresponding resin gel times at 160° C. as compared to a control containing no catalyst. Also when a poor catalyst, or no catalyst, was used, the rate of curing was slow as is indicated by the resin description after curing for a total of 13 hours at 160° C.

*Table V*

| Example No. | Catalyst | Wt., g.[a] | Gel time at 160° C., mins. | Resin Description |
|---|---|---|---|---|
| 26 | None | | 55–60 | Flexible, Barcol <0. |
| 27 | Stannous octoate | 0.15 | <15 | Rigid, Barcol 10–18. |
| 28 | Dioctyltin maleate. | 0.14 | 105–120 | Flexible, Barcol <0. |
| 29 | Dibutyltin di(2-ethylhexoate). | 0.20 | 80 | Do. |
| 30 | Dibutyltin dilaurate. | 0.24 | 80 | Do. |
| 31 | Octyltin trilaurate. | 0.30 | 35–40 | Do. |

[a] The catalyst concentration was about 0.3 percent as tin.

EXAMPLE 32–41

Methyl nadic anhydride methylbicyclo-[2.2.1]heptane-2,3-dicarboxylic anhydride) was reacted with a variety of di- and triexpoxides using stannous octoate as a catalyst and a series of controls run without the stannous octoate. The methyl nadic anhydride 0.9 g.) was placed in a test tube to which was added enough of the desired epoxide so that the ratio of epoxide to carboxyl groups was 1:1. About 2 percent stannous octoate (0.6 percent tin) was used as the catalyst. The stoppered tubes were held at 120° C. for 195 minutes and then at 160° C. for 6 hours. The gel time and description of the resins is recorded in Table VI below.

*Table VI*

| Example No. | Name | Wt., g. [a] | Stannous Octoate, g. [b] | Mins. at 120° C. | Description of Resin [d] | |
|---|---|---|---|---|---|---|
| | | | | | Barcol | Remarks |
| 32 | Bis(2,3-epoxycyclopentyl) ether. | 0.91 | 0.036 | (c) | 35; 40 | Strong tough resin. |
| 33 | ----do---- | 0.91 | | | | Viscous liquid. |
| 34 | Vinyl cyclohexene dioxide | 0.7 | 0.032 | 5 | 40; 45 | Strong tough resin. |
| 35 | ----do---- | 0.7 | | | | Rubbery gel—no strength. |
| 36 | Dicyclopentadiene dioxide | 0.82 | 0.034 | (c) | Too weak | Weak brittle resin. |
| 37 | ----do---- | 0.82 | | | | Rubbery soft gel. |
| 38 | Bis(3,4-epoxy-6-methyl-cyclohexyl methyl) adipate. | 2.2 | 0.062 | 75 | 33 | Strong tough resin. |
| 39 | ----do---- | 2.2 | | | Too soft | Do. |
| 40 | 1,2,3-propanetriol tris(3,4-epoxycyclohexane carboxylate). | 1.8 | 0.058 | 75 | 40; 45 | Soft tough resin. |
| 41 | ----do---- | 1.8 | | | 45 | Strong tough resin. |

[a] Each charge contains 0.9 g. methyl nadic anhydride plus the amount of epoxide necessary for the epoxide to carboxyl ratio to be 1:1.
[b] Used about 2 weight percent (0.6 percent based on tin).
[c] Viscous but not gelled after 195 mins. at 120° C.
[d] At room temperature, after 195 mins. at 120° C. plus 6 hours at 160° C.

EXAMPLES 42–44

The utility of stannous catalysts with epoxides of the cyclohexene oxide type as compared to glycidyl epoxides was demonstrated in the preparation of rigid epoxide foams by the following procedure.

Stannous octoate was dissolved in a half-acid ester prepared by reacting the propylene oxide adduct of glycerol (molecular weight 266) with excess maelic anhydride. A solution of the appropriate epoxide, tolylene diisocyanate (20% 2,6- and 80% 2,4-isomers), trichlorofluoromethane (Ucon 11) and a silicone oil surfactant (siloxane-oxyalkylene copolymer) was prepared and mixed into the catalyst-adduct solution. All materials were at a temperature of 28° C. before mixing.

In Example 42, using 3,4-epoxy-6-methylcyclohexylmethyl 3,4-epoxy-6-methylcyclohexanecarboxylate, the ingredients were mixed for 2 minutes, foaming was noticed in 3.5 minutes and rise was complete (7.5 inches) in 10 minutes, the time being measured from the instant all ingredients were blended together. A rigid foam having a density of 2.6 pounds per cubic foot was obtained. In Example 43, using the diglycidyl ether of bis(4-hydroxyphenyl)propane, the materials were mixed for 4 minutes and a rise of only one inch in 15 minutes noted. After being placed in an oven heated to 70° C. for one hour, a total rise of 3.5 inches was obtained but collapse occurred after cooling to room temperature. A viscous foamy material was obtained. Using the diglycidyl ether of bis(4-hydroxyphenyl)propane again in Example 44, the ingredients were mixed and allowed to stand at room temperature overnight. The rise observed was about an inch and the mass a viscous foamy liquid. The specific formulations used in Examples 42–44 are shown below in Table VII.

*Table VII*

COMPARISON OF EPOXIDES IN FOAM PREPARATION [a]

| Example No. | Epoxide | | Hardener [d] Wt., g. | Tolylene Diisocyanate Wt., g. | Ucon 11, wt., g. | Stannous Octoate Wt., g. | Surfactant Wt., g. |
|---|---|---|---|---|---|---|---|
| | Name | Wt., g. | | | | | |
| 42 | (b) | 200 | 83 | 23 | 47 | 3.6 | 3.6 |
| 43 | (c) | 250 | 83 | 23 | 53 | 4.1 | 4.1 |
| 44 | (c) | 250 | 83 | 23 | 53 | 4.1 | 4.1 |

[a] Foams made using ratio of epoxide:COOH:NCO equivalents of 1:0.3:0.2, 1 percent stannous octoate, 13 percent Ucon-11 and 1 percent X-520 (based on total weight of foam).
[b] 3,4-epoxy-6-methylcyclohexylmethyl 3,4-epoxy-6-methylcyclohexanecarboxylate.
[c] Diglycidyl ether of bis(4-hydroxyphenyl)propane.
[d] Half-acid ester prepared by reacting the propylene oxide adduct of glycerol (mol. wt. 266) with excess maleic anhydride.

EXAMPLES 45–46

The utility of stannous catalysts was further demonstrated by the preparation of resin summarized in Table VIII below. Using polymerized fatty acids as the organic hardener, the resin prepared from the diglycidyl ether of

*Table VIII*

COMPARISON OF EPOXIDES IN RESIN PREPARATIONS [a]

| Example No. | Epoxide | | Trimer Acid,[d] g. | Equiv. Epoxide: Equiv. Acid | Gel Time at 160[b] C., Mins. | Resin Description |
|---|---|---|---|---|---|---|
| | Name | Wt., g. | | | | |
| 45 | (b) | 8.4 | 6.5 | 1.0:0.5 | >150 | Flexible, Barcol <0. Soft, sticky gum on bottom. |
| 46 | (c) | 7.55 | 7.45 | 1.0:0.5 | <15 | Rigid, Barcol 10–18. |

[a] Used 0.15 g. stannous octoate (1.0 percent=0.3 percent as tin) in both examples.
[b] Diglycidyl ether of bis(4-hydroxyphenyl)propane.
[c] 3,4-epoxy-6-methylcyclohexylmethyl 3,4-epoxy-6-methylcyclohexane carboxylate.
[d] Emery 3102S trimer acid of Examples 19–25.

bis(4-hydroxyphenyl)propane was sticky and gummy on the bottom, illustrating the incompatibility of the materials. However, with resins prepared from epoxides containing the cyclohexene oxide structure, all materials were compatible and a hard resin was obtained.

What is claimed is:

1. A curable mixture comprising (1) an epoxide compound selected from the group consisting of epoxidized dicyclopentadiene, an alkylene di(epoxycyclohexanecarboxylate), an apoxycyclohexylalkyl epoxycyclohexanecarboxylate, epoxycyclohexylmethyl aliphatic dicarboxylates, and epoxycyclohexylalkyl phenylenedicarboxylates, and (2) a divalent tin compound selected from the group consisting of divalent tin salts of aliphatic mono- and dicarboxylic acids containing up to 54 carbon atoms.

2. A curable mixture comprising epoxidized dicyclopentadiene and a stannous salt of the formula

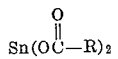

wherein R is aliphatic hydrocarbon having 2 to 18 carbon atoms.

3. A curable mixture comprising an alkylene bis(epoxycyclohexanecarboxylate) and a stannous salt of the formula

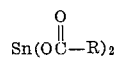

wherein R is aliphatic hydrocarbon having 2 to 18 carbon atoms.

4. A curable mixture comprising an epoxycyclohexylalkyl epoxycyclohexanecarboxylate and a stannous salt of the formula

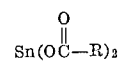

wherein R is aliphatic hydrocarbon having 2 to 18 carbons.

5. A curable mixture comprising an epoxycyclohexylmethyl aliphatic dicarboxylate and a stannous salt of the formula

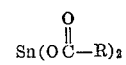

wherein R is aliphatic hydrocarbon having 2 to 18 carbon atoms.

6. A curable mixture comprising an epoxycyclohexylalkyl phenylenedicarboxylate and a stannous salt of the formula

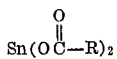

wherein R is aliphatic hydrocarbon having 2 to 18 carbons.

7. A curable mixture comprising (1) an epoxide compound selected from the group consisting of epoxidized dicyclopentadiene, an alkylene di(epoxycyclohexanecarboxylate), an epoxycyclohexylalkyl epoxycyclohexanecarboxylate, epoxycyclohexylmethyl aliphatic dicarboxylates, and epoxycyclohexylalkyl phenylenedicarboxylates, (2) a divalent tin compound selected from the group consisting of divalent tin salts of aliphatic mono- and dicarboxylic acids containing up to 54 carbon atoms, and (3) a curing amount of an organic hardener selected from the group consisting of polyfunctional amines, polycarboxylic acids, polycarboxylic acid anhydrides, polyhydric phenols, polyhydric alcohols, polythiols, polyisocyanates, polythioisocyanates and mixtures of the aforementioned hardeners.

8. A curable mixture comprising 3,4-epoxy-6-methylcyclohexylmethyl 3,4-epoxy-6-methylcyclohexanecarboxylate and a divalent tin compound selected from the group consisting of divalent tin salts of aliphatic mono- and dicarboxylic acids containing up to 54 carbon atoms.

9. A curable mixture comprising bis(3,4-epoxy-6-methycyclohexylmethyl)adipate and a divalent tin compound selected from the group consisting of divalent tin salts of aliphatic mono- and dicarboxylic acids containing up to 54 carbon atoms.

10. A resin forming process comprising contacting an epoxide compound selected from the group consisting of epoxidized dicyclopentadiene, an alkylene di(epoxycyclohexanecarboxylate), an epoxycyclohexylalkyl epoxycyclohexane carboxylate, epoxycyclohexylmethyl aliphatic dicarboxylates, and epoxycyclohexylalkyl phenylenedicarboxylates, with a divalent tin compound selected from the group consisting of divalent tin salts of aliphatic mono- and dicarboxylic acids containing up to 54 carbon atoms.

References Cited in the file of this patent
UNITED STATES PATENTS

| | | |
|---|---|---|
| 2,767,158 | Schlenker et al. | Oct. 16, 1956 |
| 2,801,228 | Stark et al. | July 30, 1957 |
| 2,935,488 | Phillips et al. | May 3, 1960 |